UNITED STATES PATENT OFFICE.

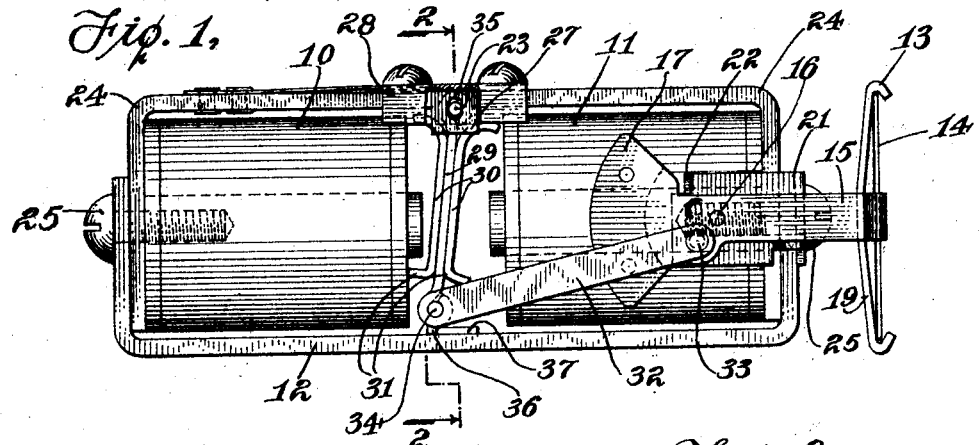
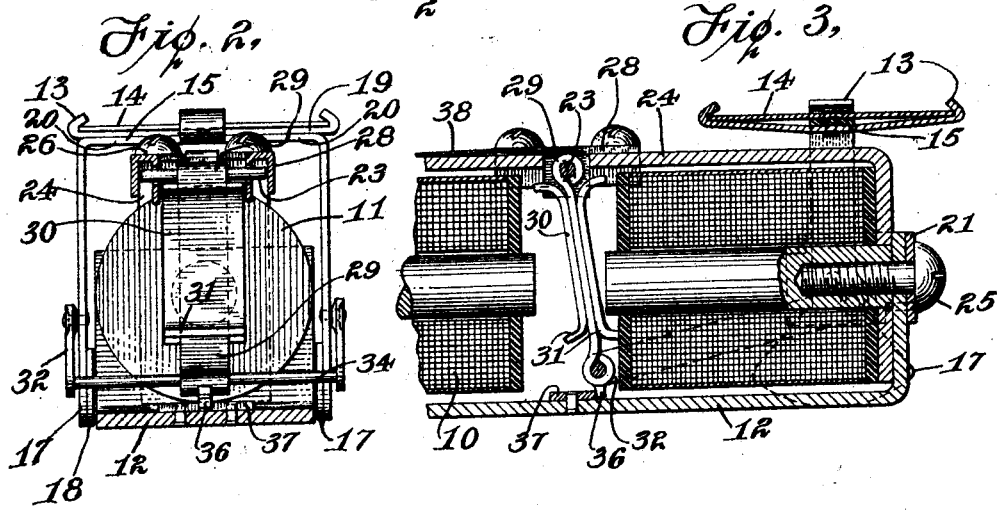
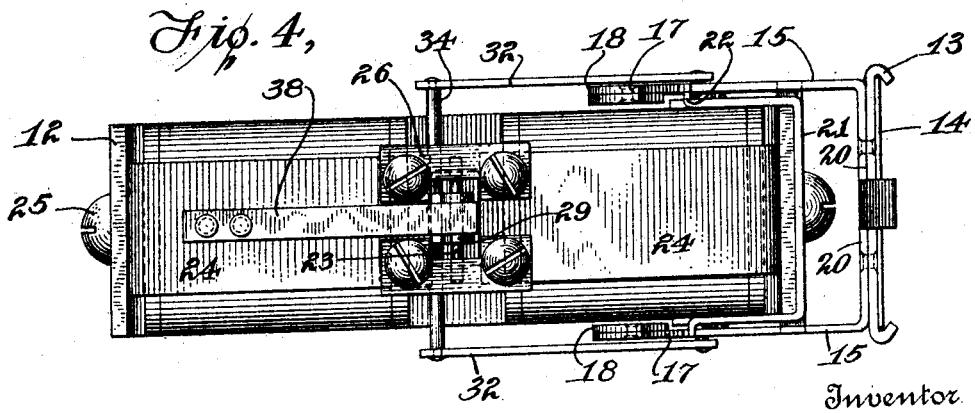

FRANK W. WOOD, OF MONTCLAIR, NEW JERSEY, ASSIGNOR TO CHARLES CORY & SON, INCORPORATED, OF NEW YORK, N. Y., A CORPORATION OF NEW YORK.

ANNUNCIATOR DROP.

1,405,812.  Specification of Letters Patent.  Patented Feb. 7, 1922.

Application filed October 24, 1919. Serial No. 332,984.

*To all whom it may concern:*

Be it known that I, FRANK W. WOOD, a citizen of the United States, and resident of Montclair, in the county of Essex and State of New Jersey, have invented certain new and useful Improvements in Annunciator Drops, of which the following is a specification.

My invention relates to annunciators, and particularly to an electrically operated self-contained annunciator unit.

My invention is particularly applicable to the type of annunciator drop in which a pivoted indicating element is normally held in inoperative position and is dropped into operative position behind a sight window by the energizing of an electromagnet.

Mechanical means is customarily employed in actual practice for raising the indicator to inoperative position; but this construction is objectionable when the annunciator is located in a relatively inaccessible place, as is often desirable, or where the indicator return mechanism has to be operated from a distance. While various devices providing automatic means both for dropping the indicator into position behind the window and for elevating it to inoperative position are known, such devices have not come into general use in competition with the mechanical return type, as the former fail to combine the requisite characteristics of a practical annunciator drop.

Such a construction must be both simple and very compact to permit the use of a plurality of drops in an annunciator of limited size. The units must be readily accessible, removable and replaceable without seriously disturbing the casing. Above all, the mechanism must be not only durable, but absolutely reliable and positive in its action regardless of continued hard usage and exacting conditions of operation, the latter including vibration, shocks, and blows. When used in certain locations, it is furthermore absolutely necessary that the construction of the drop be such as to prevent any derangement caused by alteration of its position, such as is caused by the usual movements of a vessel and continuous vibration caused by engines and other machines, as well as the sudden violent shock of direct blows, the firing of guns, or the impact of projectiles.

Under such conditions, all of which exist on shipboard, and some of which occur in factories, engine rooms, on railways and on airships, the usual indicator drops into operative position without actuation, rendering the device unreliable in such locations.

An object of my invention is to provide an annunciator drop unit having an indicator which is shifted both into and from operative position at will.

A further object is to provide an indicator which cannot be shifted by vibration or change in position of the annunciator.

I also disclose a construction equally operative in any position of the annunciator to shift the indicator positively in either direction. In the preferred form of my invention, I have arranged the indicator and actuating mechanism in the form of a self-contained unit, which may be mounted and detached without disturbing adjacent units and which is extremely compact, simple, and positive in operation.

I have also disclosed yieldable means for retaining the indicator in either of two fixed positions in the absence of actuation of the shifting means.

In the specific construction of the indicator, I have disclosed an arrangement whereby the indicator may be shifted with equal facility in either direction without overcoming the effect of gravity, as is necessary with the usual vertically reciprocating drop indicator. This construction permits the use of relatively compact actuating magnets, as the friction of the bearings and the yielding stop furnish the only resistance to be overcome.

My specific construction is also particularly adapted for rapid and cheap manufacture from standard materials, and is readily assembled and taken apart.

Other objects and advantages of this construction will be apparent from the following description taken in connection with the accompanying drawings, in which Fig. 1 is a side elevation, Fig. 2 is a section on line 2—2 of Fig. 1, Fig. 3 is a longitudinal vertical section, one end being broken away, and Fig. 4 is a top plan view.

I provide a pair of opposed magnets 10 and 11 mounted in fixed position on a suitable base, such as yoke 12. I also provide an indicator 13 which may be of the usual form adapted to hold a signal-bearing card 14. The indicator is provided with supporting arms 15 pivoted at 16 to a fixed support and extending beyond said pivot to provide a counterbalancing end 17 which may carry a suitable weight 18, if necessary. While the specific construction of the indicator supports 15 and the indicator 13 is not an essential part of my invention, a convenient and cheap construction is disclosed, in which indicator 13 is composed of a pair of transverse arms 19 having their outer ends bent inwardly to form a holder for signal card 14. Arms 19, which may be connected at their intersecting portions, are mounted on supporting arms 15, as by providing inturned flanges 20 at the ends of said arms 15, to which the indicator arms 19 are connected, as by rivets.

With this construction, the entire indicator and supports are made of sheet metal stamped and connected in a very simple way, providing a durable and cheap construction.

Any desired support for pivot 16 may be provided, and preferably will be carried by yoke 12 to provide a unitary construction. I have disclosed a bracket 21 mounted on yoke 12 and carrying pivots 16. Means for limiting the swing of indicator 13 in both directions is preferably provided, and may be carried by bracket 21, the specific means disclosed consisting of ears 22 struck up from the ends of bracket 21 and engaging the upper edges of supporting arms 15 both in operative and inoperative position. While this construction is simple and practical, many other forms and arrangements of stop lugs and other forms of stops may obviously be employed.

I provide a reciprocating armature located between the adjacent poles of magnets 10 and 11 and adapted to be shifted toward either magnet. Various forms of armature may be employed, to permit reciprocation. I have disclosed an armature carried by pivot pin 23, which is mounted in fixed bearings in any desired way, said bearings preferably being connected to yoke 12 to provide a unitary structure. I have disclosed one form of bearing support, including a pair of bracket arms 24, each extending across the outer end of one of the magnets and connected thereto as by screw 25, which preferably serves also to mount the magnet on yoke 12.

I provide a pair of bearing elements 26 mounted on bracket arms 24 at opposite sides of and spanning the space between said arms, each bearing member 26 having a downwardly bent inner flange 27 carrying a bearing for pin 23, and an outer flange 28 extending across the end of pin 23 to prevent it from sliding laterally out of position. It will be apparent, however, that the bearing for pin 23 may be mounted on or carried by bracket arms 24 in various ways, the construction disclosed being particularly effective as it is simple and easy to manufacture and provides for the ready removal of the armature by detaching a bearing member 26, or by removing both bearing members 26 and lifting the armature upward into position where it may be repaired or removed.

Various forms of armature may be provided. I have disclosed a central swing plate 29, the upper end of which engages pivot rod 23, and which may be composed of relatively non-magnetic material, such as brass, which is not liable to rust. A pair of armature plates 30 is mounted, detachably or otherwise, on opposite sides of swing plate 29, and may be provided with lateral projecting portions 31 contacting with fixed abutments, such as the ends of magnets 10 and 11, to prevent the armature plates 30 from coming into direct contact with the poles of the magnets. It will be apparent that by energizing the proper magnet, the armature may be shifted in either direction.

Means is provided for oscillating the indicator 13 about pivot 16 when the armature is shifted, such means preferably consisting of links 32 pivoted to the indicator supporting arms 15 as at 33, the other ends of the links being pivoted to the armature, preferably adjacent the lower end of carrier plate 29, as by employing a long pivot pin 34 passing through suitable engaging means on the lower end of swing plate 29 and engaging the ends of links 32.

The reciprocation of the armature will oscillate the indicator 13 through the action of links 32 on carrying arms 15, as will be readily understood, the counterbalanced construction of the indicator support permitting the indicator to be shifted in either direction with equal facility and regardless of the relative position of the annunciator and the effects of gravity.

While the construction above described is completely operative and the indicator is so counterbalanced that it will not be shifted by ordinary vibrations, shocks or changes in position of the annunciator, additional means may be provided for positively holding the indicator both in operative and inoperative positions. This means preferably includes yieldable catch elements sufficiently strong to overcome the effects of external forces on the mechanism, but adapted to yield readily when the proper magnet is energized, to permit the shift of the indicator.

Obviously, many forms of catch elements may be arranged to engage the moving parts at or adjacent to their limits of movement. In the form disclosed, I have provided means for engaging the lower end of the swing plate 29 at the proper points in its reciprocation. Such means may include vertically elongated bearing slots 35 for pivot pin 23, and an end portion of swing plate 29, which may consist of a lug 36, adapted to be locked in position by a fixed check element 37 and adapted to slide over the said element 37 in response to a lifting and pulling force exerted on the armature; this arrangement affording sufficient resistance to prevent accidental movement of the armature and accidental derangement of the indicator. The check element 37 may be formed by a separate plate attached to the yoke, as shown in the drawings, but I do not limit myself to this non-integral structure nor to any particular form of check element. In the preferred form the plate 37 is so dimensioned that lug 36 will lie adjacent the edges of the plate when the armature is at its extreme positions.

When a magnet such as 11 is energized, a pulling and lifting force will be exerted on the armature by the magnetic action of the magnet pole and bracket 24 respectively, causing the lug 36 to ride up over the adjacent edge of plate 37 and drop beyond its opposite edge at the end of the armature motion. It will be apparent, however, that it will be practically impossible for external forces to exert sufficient influence on the annunciator drop to cause lug 36 to ride up over plate 37 in the absence of actuation of one of the magnets.

Spring means may be provided for forcing the armature downwardly toward plate 37. This may consist of a leaf spring 38 preferably mounted on a bracket arm 24 and pressing against the upper end of swing arm 29, thus insuring positive engagement of the lower end of the armature with the checking means provided.

I have disclosed a type of annunciator which is extremely simple, very strong and positive in action, and which in the preferred form is constructed of a relatively small number of parts, all of which can be stamped out of sheet metal.

This is important, as devices of this nature must be manufactured cheaply in order to be salable in competition with the numerous other forms now on the market. It is also extremely strong and durable, the arrangement being such that by varying the proportions of armature plates 30 and magnets 10 and 11 any desired shifting force may be applied without changing the general design and construction.

Furthermore, while certain changes in construction have been indicated, it will be apparent that many other alterations in the form shown may be made without departing from my invention as set forth in this specification.

I claim:

1. In a signalling apparatus, a yoke, a pair of coaxial magnets mounted within the yoke and having adjacent poles, bracket arms projecting inward from the yoke at the outer ends of the magnets to points adjacent to the space between the magnet poles, an armature pivotally supported in the space between magnet poles by the said bracket arms the armature being adapted to be shifted toward either pole when the magnets are selectively energized and a movable signal element connected to the armature and adapted to be shifted into either of two predetermined positions when the armature is shifted.

2. In a signalling apparatus, a yoke, a pair of coaxial magnets mounted within the yoke and having adjacent poles, an armature movably mounted between the said poles and adapted to be shifted toward either pole when the magnets are selectively energized, a bracket carried by the yoke at the outer end of one magnet and having portions extending inwardly along the sides of the magnet, a pair of supporting arms pivoted to the side portions of the said bracket and projecting past the outer end of the adjacent magnet, an indicator carried by the projecting ends of the said supporting arms, and means connecting the supporting arms and the armature to shift the indicator into either of two predetermined positions upon movement of the armature.

3. In a signalling apparatus, a yoke, a pair of coaxial magnets mounted within the yoke and having adjacent poles, an armature movably mounted between the said poles and adapted to be shifted toward either pole when the magnets are selectively energized, a bracket carried by the yoke at the outer end of one magnet and having portions extending inwardly along the sides of the magnet, a pair of supporting arms pivoted to the side portions of the said bracket and projecting past the outer end of the adjacent magnet, an indicator carried by the projecting ends of the said supporting arms, and links disposed at opposite sides of the magnets and connecting the supporting arms with the armature for movement therewith.

4. In a signalling apparatus, a yoke, a pair of coaxial magnets mounted within the yoke and having adjacent poles, an armature movably mounted between the said poles and adapted to be shifted toward either pole when the magnets are selectively energized, a bracket carried by the yoke at the outer end of one magnet and having portions extending inwardly along the sides of the magnet, a pair of supporting arms pivoted to the side portions of the said bracket and projecting past the outer end of the adjacent magnet, an indicator carried by the projecting ends of the said supporting arms, means connecting the supporting arms to the armature for movement therewith, and stops provided on the side portions of the bracket for contact with both supporting arms to limit the swing of the indicator in both directions.

5. In a signaling apparatus, a pair of alined magnets having adjacent poles, an armature pivotally mounted between the poles and adapted to be shifted toward either pole when the magnets are selectively energized, the pivotal mounting being such as to permit radial as well as pivotal movement of the said armature, a signal element connected to said armature and adapted to be shifted into either of two positions thereby, and means engaging the armature at an end opposite to the pivotal mounting thereof for maintaining said element in either of its positions when the magnets are both de-energized.

6. In a signalling apparatus, a pair of magnets having adjacent poles, a swinging armature located between the poles and adapted to be shifted toward either pole when the magnets are selectively energized, a pivot engaging one end of the armature, means supporting the pivot for radial movement, a signal element connected to the armature and adapted to be moved into either of two predetermined positions by the shifting of the armature, and a check element located in the path of the end of the armature opposite to the pivot and adapted to secure the armature in either shifted position when the magnets are not energized, the armature pivot being free for sufficient radial movement to permit the armature to ride over the check element when attracted by either magnet.

7. In a signalling apparatus, a pair of magnets having adjacent poles, a swinging armature located between the poles and adapted to be shifted toward either pole when the magnets are selectively energized, a pivot engaging one end of the armature, means supporting the pivot for radial movement, a signal element connected to the armature and adapted to be moved into either of two predetermined positions by the shifting of the armature, a check element located in the path of the end of the armature opposite to the pivot and adapted to secure the armature in either shifted position when the magnets are not energized, the armature pivot being free for sufficient radial movement to permit the armature to ride over the check element when attracted by either magnet, and resilient means for forcing the armature against the check element.

8. In a signaling apparatus, a pair of magnets having adjacent poles, an armature mounted between the poles, a pivot engaging one end of said armature, a support for said pivot having a slotted bearing for the pivot adapted to permit longitudinal movements of the armature when midway between the poles, a fixed element in the path of the opposite end of the armature adapted to force the latter to move longitudinally when shifted from one pole to the other, and a signal element connected to said armature and adapted to be located in either of two positions by the shift of the armature through selective energizing of the magnets, said fixed element serving to retain the signal element in either of said positions when the magnets are de-energized.

9. In a signalling apparatus, a supporting member, a pair of magnets carried by the said member and having adjacent poles, a swinging armature mounted between the poles and adapted to be shifted toward either pole when the magnets are selectively energized, a pivot provided on the supporting member and mounting the armature for oscillating and longitudinal sliding movement, a signal element connected to the armature and adapted to be shifted into either of two predetermined positions upon oscillating movement of the armature, a check element located on the supporting member for contact with the end of the armature opposite to the pivot when the armature is in either shifted position to secure the same therein when the magnets are not energized, the armature having sufficient freedom of longitudinal movement to permit it to ride over the check element when attracted by either magnet, and a spring carried by the supporting member and bearing against the pivot end of the armature to force the latter into contact with the check element.

10. In a signalling apparatus, a stationary magnet with its pole and magnetic circuit, a swinging armature associated with said magnet and adapted to be shifted into positions toward and away from the magnet pole, a pivotal mounting for the armature; said pivotal mounting including means for permitting radial motion of the armature, a signal element connected to the armature and adapted to be moved in either of two predetermined positions by the shifting of the armature, and a check element located in the path of movement of the armature and adapted to secure the armature in either shifted position, energization of the magnet being operative on the magnetic circuit to exert a pulling and lifting force on the armature to cause the same to ride over the check element from one position to the other.

11. In a signalling apparatus, a stationary magnet with its pole and magnetic circuit, a swinging armature associated with said magnet and adapted to be shifted into positions toward and away from the magnet pole, a pivotal mounting for one end of the armature; said pivotal mounting including means for permitting radial motion of the armature, a signal element connected to the armature and adapted to be moved in either of two predetermined positions by the shifting of the armature, and a check element located in the path of the end of the armature opposite to the pivotal mounting thereof and adapted to secure the armature in either shifted position, energization of the magnet being operative on the magnetic circuit to exert a pulling and lifting force on the armature to cause the same to ride over the check element from one position to the other.

12. In a signalling apparatus, a stationary magnet with its pole and magnetic circuit, a swinging armature associated with said magnet and adapted to be shifted into positions toward and away from the magnet pole, a pivotal mounting for the armature; said pivotal mounting including means for permitting radial motion of the armature, a signal element connected to the armature and adapted to be moved in either of two predetermined positions by the shifting of the armature, a check element located in the path of movement of the armature and adapted to secure the armature in either shifted position, energization of the magnet being operative on the magnetic circuit to exert a pulling and lifting force on the armature to cause the same to ride over the check element from one position to the other, and resilient means for forcing the armature against the check element.

13. In a signalling apparatus, a pair of magnets having adjacent poles, a swinging armature located between the poles and adapted to be shifted toward either pole when the magnets are selectively energized, a pivotal mounting for the armature, said pivotal mounting including means for permitting radial motion of the armature, a signal element connected to the armature and adapted to be moved into either of two predetermined positions by the shifting of the armature, and a check element located in the path of movement of the armature and adapted to secure the armature into either shifted position, energization of the magnet being operative to exert a pulling and lifting force on the armature to cause the same to ride over the check element from one position to the other.

Signed at New York city, in the county of N. Y. and State of N. Y. this 22nd day of October, A. D. 1919.

FRANK W. WOOD.